(12) United States Patent
Ambrose et al.

(10) Patent No.: US 10,508,964 B2
(45) Date of Patent: Dec. 17, 2019

(54) SOLENOID VALVE ASSEMBLY WITH PILOT PRESSURE CONTROL

(71) Applicant: Eaton Corporation, Cleveland, OH (US)

(72) Inventors: Steven L. Ambrose, Farmington Hills, MI (US); Daniel Bamber, Farmington Hills, MI (US); Robert A. Dayton, Attica, MI (US)

(73) Assignee: Eaton Intelligent Power Limited, Dublin (IE)

( * ) Notice: Subject to any disclaimer, the term of this patent is extended or adjusted under 35 U.S.C. 154(b) by 372 days.

(21) Appl. No.: 15/349,442

(22) Filed: Nov. 11, 2016

(65) Prior Publication Data

US 2017/0074745 A1    Mar. 16, 2017

Related U.S. Application Data

(63) Continuation-in-part of application No. 14/808,455, filed on Jul. 24, 2015, now Pat. No. 9,523,438, which
(Continued)

(51) Int. Cl.
*F16K 31/06* (2006.01)
*G01M 3/02* (2006.01)
(Continued)

(52) U.S. Cl.
CPC .............. *G01M 3/02* (2013.01); *F16K 15/183* (2013.01); *F16K 11/048* (2013.01);
(Continued)

(58) Field of Classification Search
CPC ...... F16K 11/04; F16K 11/048; F16K 15/183; F16K 17/0406; F16K 31/12;
(Continued)

(56) References Cited

U.S. PATENT DOCUMENTS 2,068,102 A   11/1933  Gaines
4,276,960 A    7/1981  Webb et al.
(Continued)

FOREIGN PATENT DOCUMENTS

CN    1435577 A    8/2003
CN    1894529 A    1/2007
(Continued)

OTHER PUBLICATIONS

International Search Report and Written Opinion of the International Searching Authority issued in International Application No. PCT/US2017/060829 dated Feb. 14, 2018.

*Primary Examiner* — Craig J Price
(74) *Attorney, Agent, or Firm* — Quinn IP Law (57) ABSTRACT

A valve assembly includes a valve body with an interior cavity and one or more supply ports, a control port, and an exhaust port each fluidly connected to the interior cavity. An armature assembly is movable within the interior cavity from a first position to a second position in response to the coil being energized. In some configurations, a regulator body, which is connected to the valve body, has an exhaust passage fluidly connected to the exhaust port. A regulator valve in the regulator body prevents fluid flow out of the exhaust passage when fluid pressure on the regulator valve is at or below a pilot pressure. The regulator valve permits fluid flow out of the exhaust passage when fluid pressure on the regulator valve is greater than the pilot pressure. The valve body is configured to provide fluid from the supply port/ports to the control port.

23 Claims, 6 Drawing Sheets

Related U.S. Application Data is a continuation of application No. PCT/US2013/031123, filed on Mar. 14, 2013.

(51) Int. Cl.
*F16K 15/18* (2006.01)
*F16K 17/04* (2006.01)
*F16K 11/048* (2006.01)

(52) U.S. Cl.
CPC ...... *F16K 17/0406* (2013.01); *F16K 31/0634* (2013.01); *Y10T 137/0318* (2015.04); *Y10T 137/86485* (2015.04)

(58) Field of Classification Search
CPC .............. F16K 31/062; F16K 31/0634; Y10T 137/86485; Y10T 137/0318
USPC .................................................. 137/625.64
See application file for complete search history.

(56) References Cited

U.S. PATENT DOCUMENTS

| | | |
|---|---|---|
| 4,582,082 A | 4/1986 | Tosseghini |
| 4,615,722 A | 10/1986 | Steffan et al. |
| 4,678,017 A | 7/1987 | Schultz |
| 4,877,048 A | 10/1989 | Oltean et al. |
| 4,938,022 A | 7/1990 | Hirata et al. |
| 5,025,625 A | 6/1991 | Morikawa |
| 5,113,705 A | 5/1992 | Earnhardt |
| 5,222,404 A | 6/1993 | Stine |
| 5,231,895 A | 8/1993 | Stine |
| 5,392,995 A | 2/1995 | Wahba |
| 5,566,983 A | 10/1996 | Gluys et al. |
| 5,779,220 A | 7/1998 | Nehl et al. |
| 5,924,675 A | 7/1999 | Hussey et al. |
| 6,772,791 B2 | 8/2004 | Neff |
| 7,076,997 B2 | 7/2006 | Dunbar et al. |
| 7,350,512 B1 | 4/2008 | Meacham et al. |
| 7,401,494 B2 | 7/2008 | Kim et al. |
| 7,921,880 B2 | 4/2011 | Jackson et al. |
| 8,353,313 B2 | 1/2013 | Dinkel |
| 8,459,218 B2 * | 6/2013 | Keller ................. F01L 13/0005 123/90.12 |
| 2002/0164255 A1 | 11/2002 | Burr et al. |
| 2003/0213523 A1 | 11/2003 | Neff |
| 2004/0021103 A1 | 2/2004 | Yang et al. |
| 2005/0116189 A1 | 6/2005 | Fisher |
| 2005/0210930 A1 | 9/2005 | Contini et al. |
| 2007/0000302 A1 | 1/2007 | Gramkow et al. |
| 2007/0028665 A1 | 2/2007 | Kim et al. |
| 2009/0050222 A1 | 2/2009 | Jackson et al. |
| 2011/0284782 A1 * | 11/2011 | Boychuk ............. F16K 31/0634 251/129.15 |
| 2012/0222634 A1 | 9/2012 | Dinkel et al. |
| 2013/0000753 A1 | 1/2013 | Penning et al. |
| 2013/0154841 A1 | 6/2013 | Kucera et al. |

FOREIGN PATENT DOCUMENTS

| | | |
|---|---|---|
| CN | 101233355 A | 7/2008 |
| CN | 101929363 A | 12/2010 |
| CN | 203431245 U | 2/2014 |
| DE | 102006036615 A1 | 2/2008 |
| JP | H10914481 A | 1/1997 |
| JP | H110332028 A | 12/1998 |
| WO | WO-2011149935 A1 * | 12/2011 ........ F16K 31/0634 |
| WO | 2014142855 A1 | 9/2014 |

* cited by examiner

SOLENOID VALVE ASSEMBLY WITH PILOT PRESSURE CONTROL

CLAIM OF PRIORITY AND CROSS-REFERENCE TO RELATED APPLICATIONS

This application is a continuation-in-part of U.S. patent application Ser. No. 14/808,455, filed Jul. 24, 2015, and now allowed, which is a continuation of International Application No. PCT/US2013/031123, filed Mar. 14, 2013, both of which are incorporated herein by reference in their respective entireties and for all purposes.

TECHNICAL FIELD

The present teachings generally relate to fluid-control valves. More specifically, aspects of this disclosure relate to solenoid valves assemblies and methods for testing such solenoid valve assemblies.

BACKGROUND

Solenoid valves can be activated by current flowing through a coil to create an electromagnetic field that causes movement of an armature within the valve. Solenoid control valves for hydraulic control systems can be used to control fluid under pressure, such as to switch latch pins in switching lifters and lash adjusters in engine valve systems.

A solenoid valve can be energized to permit fluid to flow through a control passage to a hydraulic component. The time to fill the control passage with pressurized fluid may slow a desired response of the component. Additionally, if air is permitted to enter the control passage, actuation of the component by the fluid can be slower or less precise.

SUMMARY

Disclosed herein are electromechanical solenoid valves for regulating, directing and/or controlling the flow of a fluid, methods for making, for using and for testing such valve assemblies, and hydraulic components with a fluid-controlling solenoid valve assembly. In an example, a valve assembly is disclosed that enables a pilot pressure to be continuously provided in a control passage to a fluid actuated component, e.g., to alleviate problems associated with air in the passage and to shorten actuation response time. The valve assembly includes a selectively energizable coil, a valve body, and an armature assembly. The valve body defines an interior cavity and has a primary supply port, a secondary supply port, a control port, and an exhaust port, each of which extends into the interior cavity. The armature assembly is configured to move within the interior cavity from a first position to a second position when the coil is energized. A regulator body is operatively connected to the valve body and has an exhaust passage positioned at the exhaust port.

A regulator valve is positioned in the regulator body and is configured to prevent flow out of the exhaust passage when fluid pressure on the regulator valve is not greater than a predetermined pilot pressure, and to permit flow out of the exhaust passage when fluid pressure on the regulator valve is greater than the predetermined pilot pressure. The valve body and armature assembly are configured to permit fluid flow from the secondary supply port to the control port at the predetermined pilot pressure, and to block fluid flow from the primary supply port to the control port when the armature is in one of the first position and the second position. The valve body and the armature assembly are configured to permit fluid from the primary supply port to the control port at a supply pressure greater than the predetermined pilot pressure when the armature is in the other of the first position and the second position.

Other aspects of the present disclosure are directed to a solenoid valve assembly with a valve body that includes an interior cavity and a supply port, a control port, and an exhaust port, each of which is fluidly connected to the interior cavity. A selectively energizable coil with an interior core is operatively connected to the valve body. An armature assembly moves within the interior cavity of the valve body from a first position to a second position in response to the coil being energized. In so doing, the armature assembly and valve body are cooperatively configured to regulate fluid flow from the supply port to the control port when the armature is in the first and/or second position. A pole piece is partially or wholly disposed within the interior core of the coil, adjacent the armature assembly. This pole piece is fluidly sealed, e.g., via a compressible O-ring seal, to the valve body. For some applications, the pole piece and valve body cooperatively define a fluid leak path that allows air to pass therethrough in response to an inadvertent leak in the fluid seal (e.g., due to a crack in, improper seating of, defect in, or absence of the O-ring seal). In some configurations, the pole piece includes a flange that seats against the valve body, where the flange includes one or more chamfered portions that help to define the fluid leak path. A chamfered edge at the upper extent of the valve body may also contribute to defining this intentional fluid leak path.

According to other aspects of the present disclosure, a solenoid valve assembly is presented that operates, for example, to regulate fluid flow to a fluid actuated component (e.g., an engine valve lifter of an internal combustion engine assembly). The solenoid valve assembly includes a valve body that can be mounted, for example, to a cylinder block. This valve body has an interior cavity with one or more supply ports, a control port, and an exhaust port. Each port extends through the valve body and fluidly connects to the interior cavity. The supply port and control port fluidly connect to the fluid actuated component. A selectively energizable annular coil with an interior core is attached to the valve body. An armature assembly is disposed within the interior cavity of the valve body and selectively movable within the interior core of the annular coil from a first position to a second position responsive to the coil being energized. The armature assembly and valve body cooperatively regulate fluid flow from the supply port to the control port at a predetermined supply pressure when the armature is in the first and/or second position. A pole piece is attached to the valve body and at least partially disposed within the interior core of the coil adjacent the armature assembly. The pole piece is fluidly sealed against the valve body, e.g., via a flexible seal. In some configurations, one or more chamfered portions of a flange of the pole piece cooperate with a chamfered edge of a tubular portion of the valve body to define an intentional fluid leak path that passes air therethrough when there is an inadvertent leak in the fluid seal (e.g., the seal is missing or damaged or defective or improperly installed).

Other aspects of the present disclosure are directed to methods of making, methods of using and methods of testing any of the valve assemblies disclosed herein. In an example there is disclosed a method of testing a solenoid valve assembly for regulating fluid flow to a fluid actuated component. The method includes, in any order and in any combination: fluidly connecting the valve body of the solenoid valve assembly to a fluid actuated component, the valve body defining an interior cavity and a supply port, a control port, and an exhaust port each fluidly connected to the interior cavity, the solenoid valve assembly including a selectively energizable coil attached to the valve body and defining an interior core; energizing/denergizing the coil to responsively move the armature assembly disposed within the interior cavity of the valve body from a first position to a second position, the armature assembly and the valve body regulating fluid flow from the supply port to the control port at a predetermined supply pressure when the armature is in the first and/or second position; and, identifying an air leak of a fluid seal between the valve body and a pole piece that is partially or wholly disposed within the interior core of the coil adjacent the armature assembly, wherein the pole piece and valve body cooperatively define a fluid leak path that passes air therethrough responsive to the inadvertent leak of the fluid seal.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and representative modes for carrying out the present disclosure when taken in connection with the accompanying drawings and the appended claims. Moreover, this disclosure expressly includes any and all combinations and subcombinations of the elements and features presented above and below.

The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope and spirit of the disclosure.

DETAILED DESCRIPTION OF ILLUSTRATED EXAMPLES

Figure 1:
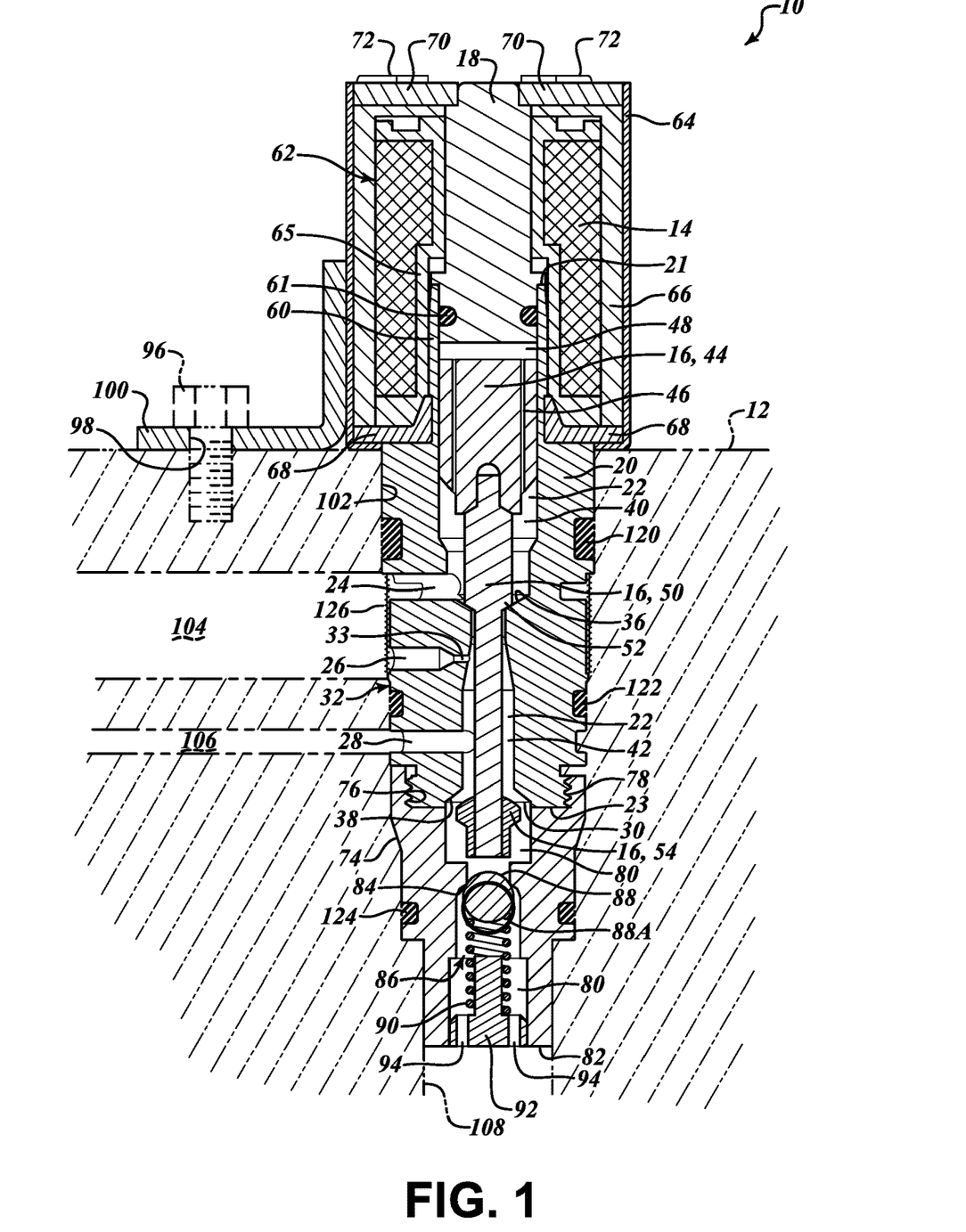
FIG. 1 is a side-view illustration of a representative solenoid valve assembly in accordance with aspects of the present disclosure, taken in cross-section along line 1-1 of FIG. 3 to show an armature assembly in a first position, and a regulator valve in a closed position (in solid) and in an open position (in phantom).

Referring to the drawings, wherein like reference numbers refer to like components throughout the several views, FIG. 1 shows a representative valve assembly 10 mounted, for example, to an engine cylinder block 12, shown in phantom, and operable to control fluid flow within a portion of the cylinder block 12, as described hereinbelow. The valve assembly 10 can be referred to as a solenoid valve assembly as it includes an energizable coil 14 that creates an electromagnetic flux path when energized to move an armature assembly 16 toward a pole piece 18.

Figure 4:
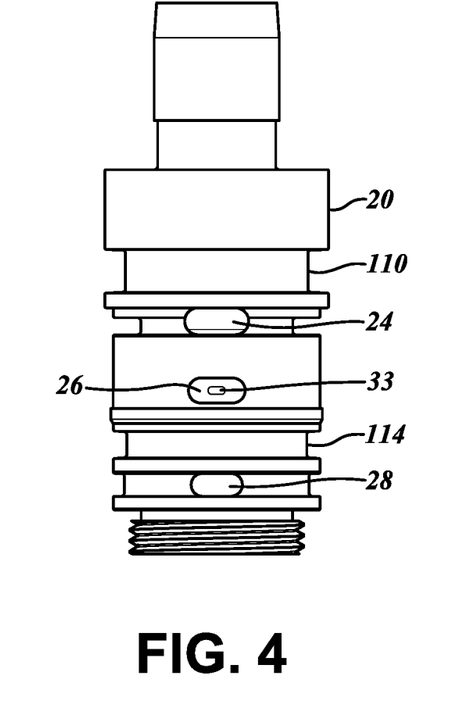
FIG. 4 is a side-view illustration of a valve body of the representative solenoid valve assembly of FIG. 1.

The valve assembly 10 of FIG. 1 includes a valve body 20 with an interior cavity 22 that extends through the valve body 20 from a first end 21 to a second end 23 of the valve body 20. The valve body 20 defines a primary supply port 24, a secondary supply port 26, a control port 28, and an exhaust port 30. Each of the primary supply port 24, the secondary supply port 26, and the control port 28 extend from an external surface 32 of the valve body 20 to the interior cavity 22. The secondary supply port 26 tapers to a restriction 33 that is narrower, and thus more restrictive to fluid flow than the primary supply port 24. FIG. 4 shows the secondary supply port 26 and the restriction 33. The exhaust port 30 is at the second end 23 of the valve body 20.

The valve body 20 forms a first valve seat 36 and a second valve seat 38. The first valve seat 36 is between the primary supply port 24 and the secondary supply port 26. The second valve seat 38 is between the control port 28 and the exhaust port 30. Thus, both the secondary supply port 26 and the control port 28 are between the valve seats 36, 38. The valve seats 36, 38 effectively divide the interior cavity 22 into a supply chamber 40, and a control chamber 42.

The armature assembly 16 represented in FIG. 1 includes three separate components interconnected to move within the interior chamber 22 as a unit. First, the armature assembly 16 includes an armature 44 sized to substantially fill the interior cavity 22 adjacent the pole piece 18. The armature 44 is operable to slide within the interior cavity in response to the energization or deenergization of the coil 14. A gap 48 between the pole piece 18 and the armature 44 can be an air gap. Passages 46 in the armature 44 permit oil to move between the supply chamber 40 and the gap 48 as the armature 44 moves.

Second, the three piece armature assembly 16 includes a valve stem 50 that is threaded or otherwise secured to the armature 44 for common movement therewith. The valve stem 50 forms a first poppet 52 that is configured to seat against the first valve seat 36 when the armature assembly 16 is in the first position shown in FIG. 1. When the first poppet 52 is seated, fluid cannot flow between the supply chamber 40 and the control chamber 42 past the first valve seat 36.

Finally, the three-piece armature assembly 16 includes a second poppet 54 that is threaded, pinched, or otherwise secured to an end of the valve stem 50. The valve stem 50 is of sufficient length so that the second poppet 54 is spaced from the second valve seat 38 when the armature assembly 16 is in the first position of FIG. 1. Accordingly, fluid can flow past the second valve seat 38 from the control chamber 42.

Figure 2:
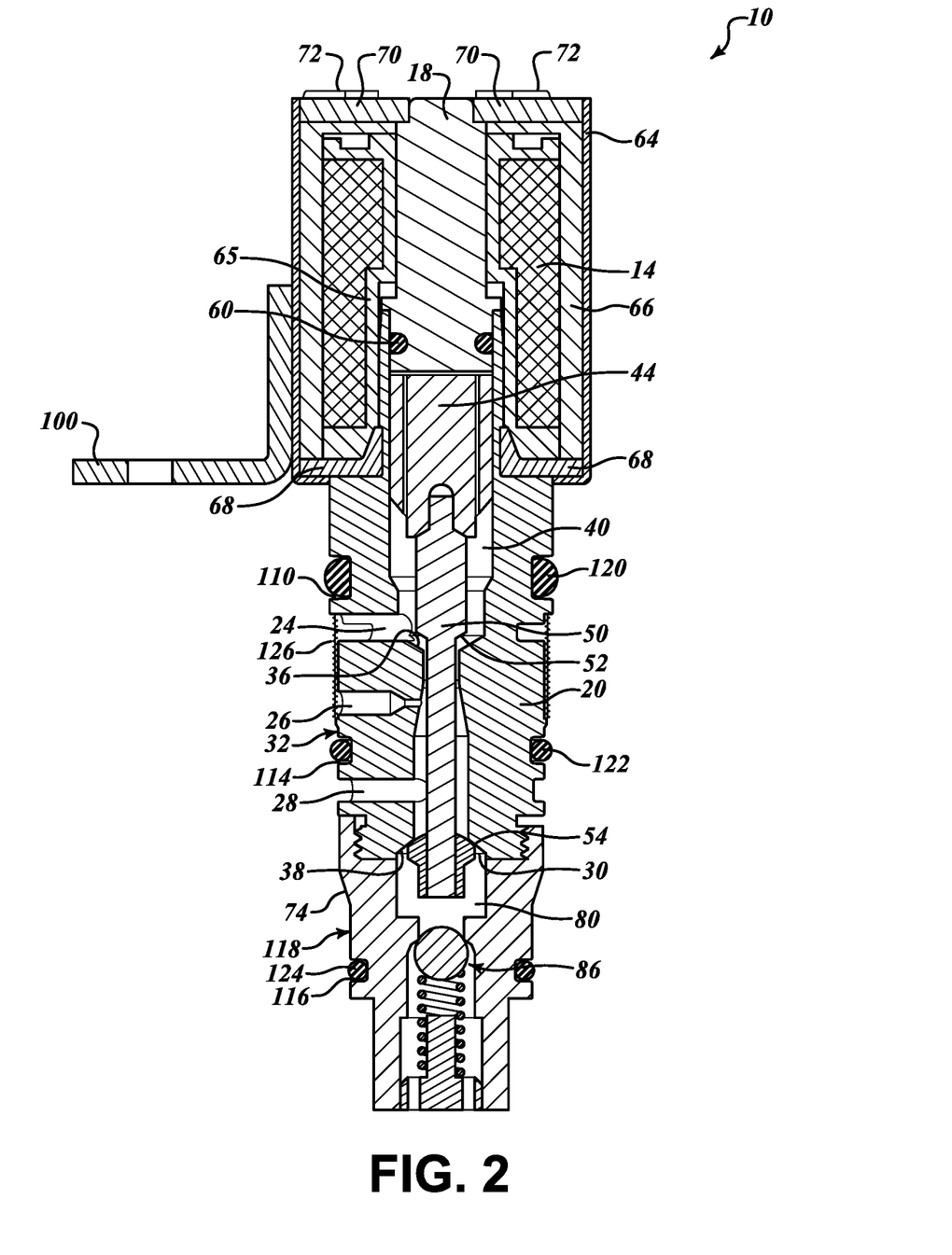
FIG. 2 is a cross-sectional side-view illustration of the solenoid valve assembly of FIG. 1, showing the armature assembly in a second position.

The armature assembly 16 is moved to the second position, as shown in FIG. 2, such as by energizing the coil 14 (or by deenergizing the coil 14 if the coil 14 is energized in FIG. 1). This will draw the armature assembly 16 toward the pole piece 18 such that the second poppet 54 will be seated against the second valve seat 38, and the first poppet 52 will be spaced from the first valve seat 36, as shown in FIG. 2. When the second poppet 54 is seated at the second valve seat 38, fluid cannot flow from the control chamber 42 past the exhaust port 30. Because the first poppet 52 is spaced from the first valve seat 36, fluid can flow from the primary supply port 24 to the control chamber 42 and the control port 28.

Figure 3:
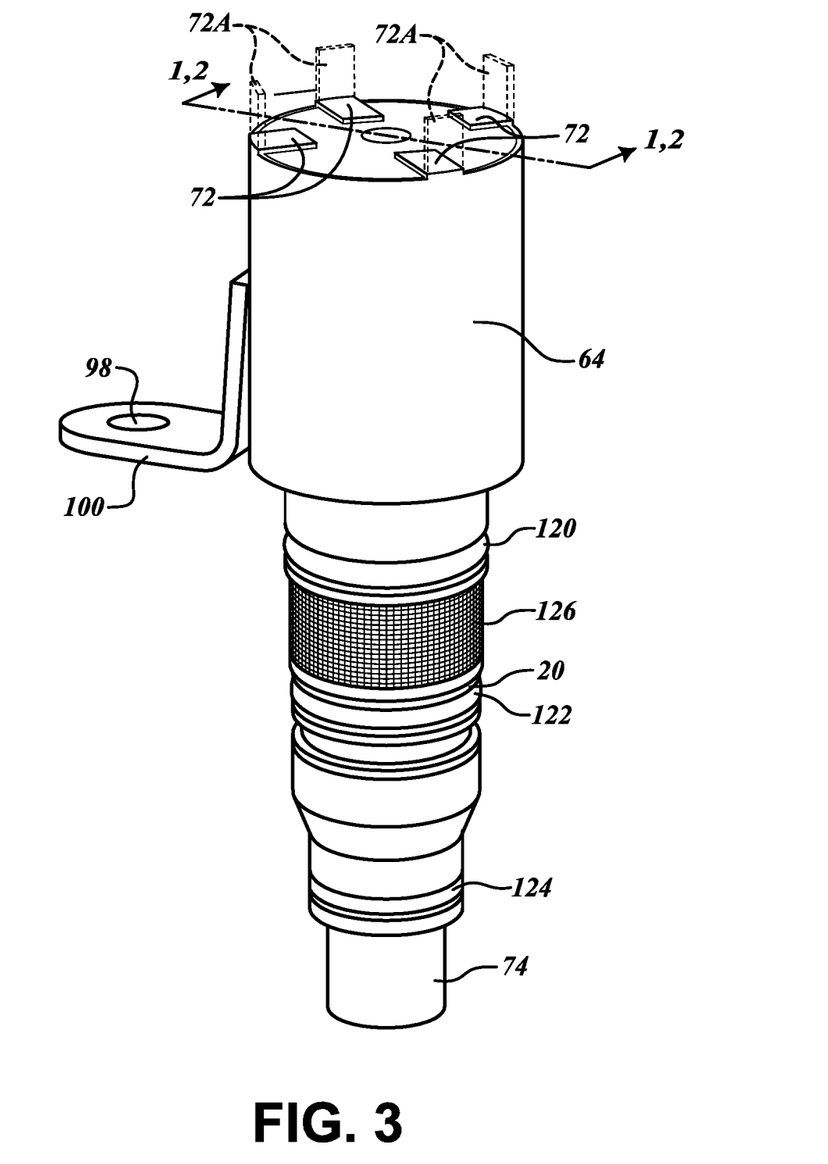
FIG. 3 is a side perspective-view illustration of the representative solenoid valve assembly of FIG. 1.

The valve body 20 includes a tubular distal portion 60 that is secured within a coil assembly 62 and solenoid can cover 64. A seal 61 fit within a groove of the pole piece 18 fluidly seals to the distal portion 60. The coil assembly 62 includes the annular coil 14 which is wound around an annular bobbin 65. A mold portion 66 surrounds the bobbin 65 and fits within the can cover 64. An annular flux collector 68 is housed in the can cover 64 and seated against the valve body 20 surrounding the armature 44. A cap 70 overlays the bobbin 65 and surrounds an end of the pole piece 18. Tabs 72 bent from the can cover 64 secure the cap 70 at least partially within the can cover 64. FIG. 3 shows the tabs 72 in a first position 72A in phantom prior to being bent.

When the coil 14 is energized, such as by a battery (not shown) that is operatively connected to the coil 14 and places a voltage across the coil 14, current will flow in the coil 14. This, in turn, creates a magnetic flux that causes the armature assembly 16 to move within the interior cavity 22 between the first position and the second position. In the embodiment shown herein, the armature assembly 16 is in the first position of FIG. 1 when the coil 14 is not energized, and is in the second position of FIG. 2 when the coil is energized. In alternative embodiments, the armature assembly 16 could be positioned relative to the coil 14 differently so that the armature assembly 16 would move from the second position to the first position when the coil 14 is energized.

The valve assembly 10 also includes a regulator body 74 that is secured to the valve body 20 at the second end 23 distant from the coil 14. The regulator body 74 has internal threads 76 that thread to external threads 78 of the valve body 20 adjacent the exhaust port 30. Alternatively, the regulator body 74 could be connected to the valve body 20 by bonding, press-fitting, or other means.

The regulator body 74 has an exhaust passage 80 that is aligned with and fluidly connect to the exhaust port 30 and extends through the regulator body 74 to a terminal end 82 of the regulator body 74. The regulator body 74 has a valve seat 84, referred to herein as a regulator valve seat, in the exhaust passage 80. A regulator valve 86 is positioned in the regulator body 74. The regulator valve 86 includes a check ball 88 and a spring 90 biasing the check ball 88 against the regulator valve seat 84. A plug 92 is configured to seat in the exhaust passage 80. The plug 92 has one or more orifices 94 extending therethrough to permit fluid to pass from the exhaust passage 80 through the plug 92. The plug 92 supports the spring 90 against the check ball 88. Although a ball 88 and spring 90 are used for the regulator valve 86, other types of valves that are biased to a closed position and that open in response to a predetermined pressure can be used instead.

The valve assembly 10 can be fastened to the cylinder block 12 via a bolt 96 (shown in phantom) or other fastener that extends through an opening 98 in a mounting bracket 100 to secure the valve assembly 10 within a valve bore 102 in the cylinder block 12. The cylinder block 12 has a supply passage 104, a control passage 106 and a sump passage 108. The supply passage 104 carries pressurized fluid, such as from a fluid pump. The control passage 106 directs the pressurized fluid to a fluid actuated component (not shown) such as an engine valve lifter. The sump passage 108 leads to a sump (not shown) for fluid exhausted from the valve assembly 10. The sump is fluidly connected to a pump that then recirculates the fluid to the supply passage 104 as needed.

The valve body 20 and regulator body 74 are configured so that when the valve assembly 10 is placed in the valve bore 102, the primary supply port 24 and the secondary supply port 26 are in fluid communication with the supply passage 104, and the control port 28 is in fluid communication with the control passage 106.

As best shown in FIG. 2, the valve assembly 10 includes a first annular groove 110 on the external surface 32 of the valve body 20, and a second annular groove 114 also on the external surface 32. The regulator body 74 has a third annular groove 116 on an external surface 118 of the regulator body 74. A first seal 120 is in the first annular groove 110, a second seal 122 is in the second annular groove 114, and a third seal 124 is in the third annular groove 116. Each of the seals 120, 122, 124 is a compliant O-ring seal. Other suitable types of seals can be used instead of O-ring seals. When the valve assembly 10 is placed in the cylinder bore 102, the compliant seals 120, 122 are compressed between the valve body 20 and the cylinder head 12, and the compliant seal 124 is compressed between the regulator body 74 and the cylinder head 12. The supply passage 104, the primary supply port 24, and the secondary supply port 26 are between the first and second seals 120, 122. A wire mesh filter 126 is secured around the valve body 20 to filter fluid entering the primary supply port 24 and the secondary supply port 26. The control passage 106 and the control port 28 are between the second and third seals 122, 124. The seals 120, 122, 124 thus prevent air outside of the cylinder block 12 from reaching the passages 104, 106, 108, and help to ensure the integrity of the various fluid routes through the valve assembly 10 and cylinder block 12. In FIG. 4, the seals 120, 122 are removed from the valve body 20 to show the grooves 110, 114.

The regulator valve 86 is a passive feature of the valve assembly 10 that functions in conjunction with the actively actuated armature assembly 16 to maintain a predetermined pilot pressure in the control chamber 42 and the control passage 106 when the armature assembly 16 is in the first position of FIG. 1. With the first poppet 52 seated at the first valve seat 36, supply fluid cannot pass from the supply passage 104 to the control chamber 42 and control passage 106. The armature assembly 16 will be in the first position with the first poppet 52 seated when it is not desired to provide fluid through the control passage 106, such as when it is not desired to actuate a fluid component in communication with the control passage 106. Accordingly, the controller (not shown) does not activate the valve assembly 10. Fluid from the supply passage 104 is able to enter the control chamber 42 via the secondary supply port 26, however, as the secondary supply port 26 is between the first valve seat 36 and the second valve seat 38. The fluid that enters through the secondary supply port 26 will pass from the control chamber 42 to both the control passage 106 and the exhaust passage 80. Because of the restriction 33 in the secondary supply port 26, fluid supplied through the secondary supply port 26 will be at a lower pressure than in the supply passage 104. The restriction 33 can be sized so that the rate of fluid flow through the restriction 33 is equal to the rate of leakage from the control passage 106 downstream of the valve assembly 10. Thus, once the control passage 106 is primed with the fluid at the predetermined pressure through the secondary supply port 26, the control passage 106 will remain filled with fluid at that pressure.

The predetermined pressure is lower than a pressure required to actuate a fluid actuated component downstream of the control passage 106. Moreover, the regulator valve 86 is configured to ensure that the fluid pressure in the control chamber 42, control passage 106 and exhaust passage 80 does not rise above the predetermined pressure, so that the fluid actuated component is not unintentionally actuated. Specifically, the spring 90 has a stiffness than causes it to compress when fluid at a fluid pressure greater than the predetermined pressure acts on the check ball 88, moving the check ball 88 to the open position 88A shown in phantom. With the check ball 88 in the open position 88A, fluid exhausts from the control chamber 42 to the exhaust passage 80 past the valve seat 84, and out through orifices 94 in the plug 92. When fluid pressure is relieved in this manner, the force of the spring 90 on the check ball 88 will then overcome the force of the fluid on the check ball 88 to move the check ball 88 back to the closed position shown, so that the pressure within the chamber 42 will return to a pressure not greater than the predetermined pressure. Thus, because the secondary supply port 26 is in fluid communication with the supply chamber 40 between the two poppets 52, 54, any fluid pressure spikes that occur while the armature assembly 16 is in the first position of FIG. 1 will be relieved by the regulator valve 86.

When it is desired to actuate a fluid-actuated component downstream of the control passage 106, the electronic controller (not shown) operatively connected to the coil 14 through an electrical connector (not shown) controls a battery (not shown) to provide a voltage that causes current flow in the coil 14. The electrical connector can attach to the can 64 and extend through to the coil 14. The armature assembly 16 will be drawn toward the pole piece 18 (upward in FIG. 2), lifting the first poppet 52 off of the first valve seat 36 and seating the second poppet 54 at the second valve seat 38, as shown in FIG. 2. With the armature assembly 16 in the second position of FIG. 2, the first supply port 24 is in fluid communication with the control chamber 42, the control port 28, and the control passage 106 of FIG. 1 so that fluid is provided from the first supply port 24 to the control passage 106 at the supply pressure to actuate the fluid-actuated component. Fluid can also be provided through the secondary supply port 26 when the armature assembly 16 is in the second position. The pressure in the control chamber 42 and in the control passage 106 will be dictated by the higher supply pressure that can pass via the primary supply port 24.

When the armature assembly 16 is in the second position of FIG. 2, the regulator valve 86 does not affect the fluid pressure in the control chamber 42 as the seated second poppet 52 blocks any flow from reaching the regulator valve 96. The regulator valve 86 is thus configured to prevent flow out of the exhaust passage 80 when fluid pressure on the regulator valve 86 is not greater than the predetermined pilot pressure and permit flow out of the exhaust passage 80 when fluid pressure on the regulator valve 86 is greater than the predetermined pilot pressure and the armature assembly 16 is in the first position. The regulator valve 86 enables the control passage 106 to be pre-charged with fluid at the relatively low predetermined pilot pressure, enabling faster actuation of a fluid component when the valve assembly 16 is moved to the second position.

Figure 5:
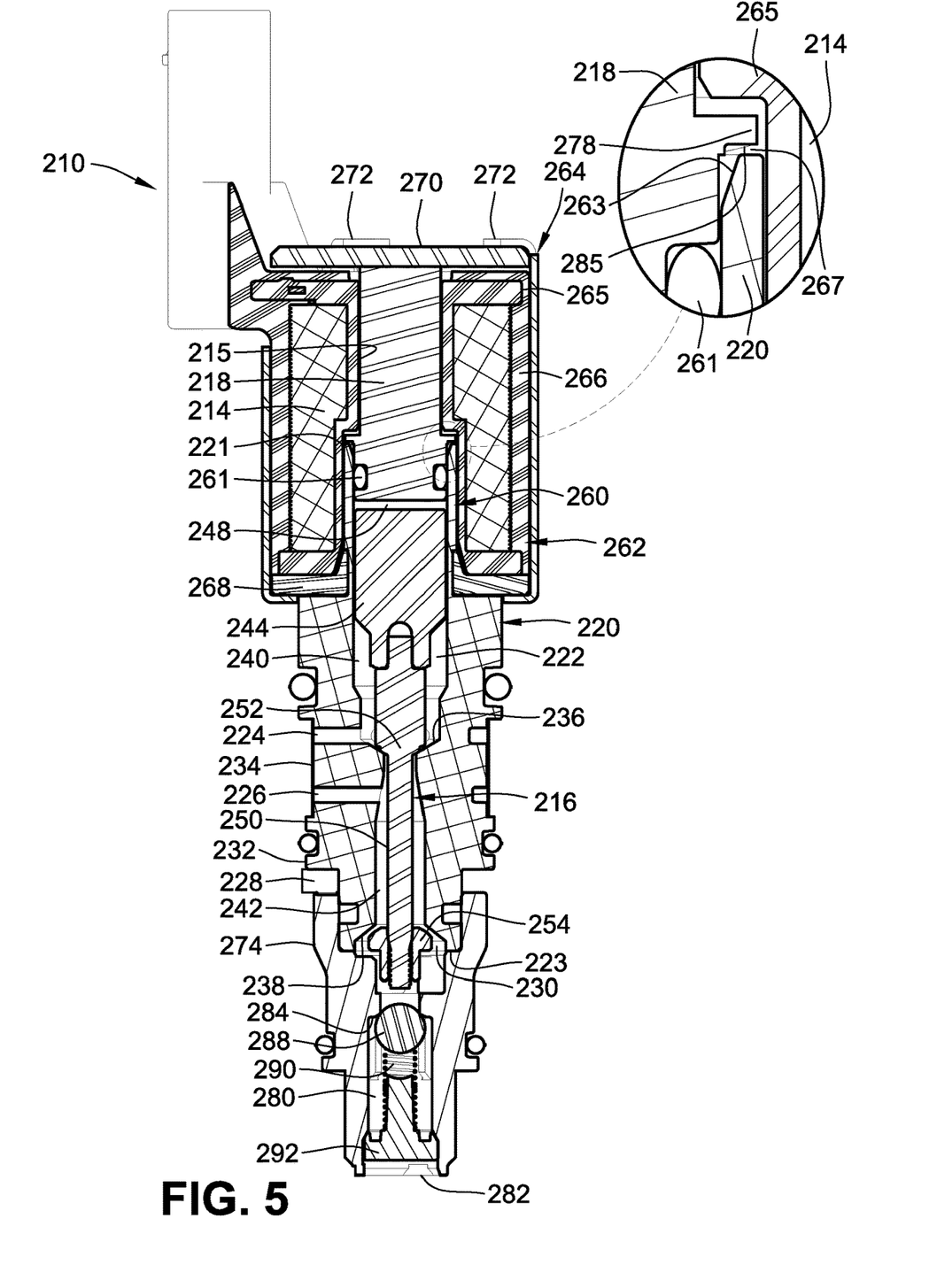
FIG. 5 is a side-view illustration of another representative solenoid valve assembly in accordance with aspects of the present disclosure, taken in cross-section to show an armature assembly in a first position, and a regulator valve in a closed position.

Referring next to FIG. 5, there is shown another representative valve assembly 210 that is operable, for example, to control fluid flow for a fluid actuated component of an engine cylinder block or other fluid system, as described hereinabove and below. While differing in appearance, the valve assembly 210 portrayed in FIG. 5 may incorporate, singly or in any combination, any of the features and options disclosed above with reference to the valve assembly 10 of FIGS. 1-4, and vice versa. The valve assembly 210 of FIG. 5 includes a valve body 220 with an interior cavity 222 that extends through the valve body 220 from a first end 221 to a second end 223 thereof. The valve body 220 is fabricated with a primary supply port 224, a secondary supply port 226, a control port 228, and an exhaust port 230, each of which extends from an external surface 232 of the valve assembly 210, through the valve body 220, to the interior cavity 222. The secondary supply port 226 is narrower and, thus, more restrictive to fluid flow than the primary supply port 224. The exhaust port 230 extend through the second end 223 of the valve body 220.

Similar to the valve body architecture illustrated in FIGS. 1 and 2, the valve body 220 of FIG. 5 is fabricated with multiple valve seats, including a first valve seat 236 that is interposed between the primary and secondary supply ports 224, 226; and a second valve seat 238 that is interposed between the control and exhaust ports 228, 230. With this arrangement, both the secondary supply port 226 and the control port 228 fluidly connect to the internal cavity 222 of the valve body 220 between the valve seats 236, 238. The valve seats 236, 238 can be said to effectively divide the interior cavity 222 into a supply chamber 240 and a control chamber 242. It is envisioned that the valve body 220 comprise greater or fewer fluid ports and valve seats than that which are shown in the drawings. A fluid filter 234, which may be in the nature of a stainless steel band etched with a screen pattern, is secured to the valve body 220 to filter fluid entering the primary and secondary supply ports 224, 226.

An armature assembly, designated generally at 216 in FIG. 5, is a tripartite construction that moves as a single unit within the interior chamber 222, e.g., along a generally rectilinear path. This armature assembly 216 is composed of a generally cylindrical armature 244 that is sized to nest substantially coterminously with the inner periphery of the interior cavity 222, adjacent a pole piece 218, and circumscribed by an electromagnetically inductive annular coil 214. Armature 244 is encased within the valve body 220, and fabricated, e.g., from steel or iron, to selectively slide along the length of interior cavity 222 in response to the energization and/or deenergization of the coil 214. A gap 248 between the pole piece 218 and the armature 244 can be filled with air or other readily compressible fluid.

An elongated, cylindrical valve stem 250 is threaded, fastened or otherwise secured to a frustoconical tip of the armature 244 for common movement therewith. A proximal end of the representative valve stem 250 of FIG. 5 is formed with a first poppet 252 that seats against the first valve seat 236 when the armature assembly 216 is in a first (deenergized) position, as shown in FIG. 5. When the first poppet 252 is properly seated, fluid is restricted from flowing between the supply chamber 240 and the control chamber 242 past the first valve seat 236. The three-piece armature assembly 216 also includes a second poppet 254 that is threaded, pinched, or otherwise secured to a distal end of the valve stem 250. The valve stem 250 is sufficiently long to ensure that the second poppet 254 is unseated from the second valve seat 238 when the armature assembly 216 is in the first position. While depicted and described herein as a three-piece construction, the armature assembly 216 can be integrally formed as a single-piece structure or may comprise any number of interconnected components. In the same vein, the shape, size and layout of the armature assembly 216 can be modified for different applications.

To move the armature assembly 216 to a second (energized) position, e.g., similar to that shown in FIG. 2, an electric current is applied to the electromagnetic coil 214. In so doing, the coil 214 will generate a magnetic field that acts to draw the armature assembly 216 (upwards in FIG. 5) toward the pole piece 218 such that the second poppet 254 seats against the second valve seat 238, and the first poppet 252 is spaced from the first valve seat 236. Alternative configurations may require a controller circuit modulate or remove an existing electrical current from the coil to move the armature. When the second poppet 254 is properly seated against the second valve seat 238, fluid is prevented from flowing from the control chamber 242 out through the exhaust port 230. Conversely, when the first poppet 252 is spaced from the first valve seat 236, fluid is allowed to flow from the primary supply port 224 to the control chamber 242 and the control port 228.

With continuing reference to FIG. 5, one end of the valve body 220 is formed with a tubular distal portion 260 that is captured within and circumscribed by a coil assembly 262. Both the tubular distal portion 260 and coil assembly 262 are housed inside a solenoid can cover 264. A flexible O-ring seal 261, fit within an annular groove 219 (FIGS. 6A and 6B) of the pole piece 218, is compressed between and thereby fluidly seals the pole piece 218 to an inner-diameter surface of the valve body's tubular distal portion 260. Annular coil 214, which is part of the coil assembly 262, is wound around an annular polymeric bobbin 265. A generally cylindrical mold portion 266 surrounds the bobbin 265, interposed between and concentrically aligned with the coil 214 and can cover 264. A multi-piece annular flux collector 268 is housed inside the can cover 264, surrounding the armature 244, and seated against an outer-diameter surface of the valve body's tubular portion 260. The flux collector 268 may take on a variety of forms, including the various configurations disclosed, for example, in U.S. Pat. No. 9,423,046 B2, which is incorporated herein by reference in its entirety and for all purposes. A cap 270 spans across and covers an open end of the can cover 264, overlaying the bobbin 265 in face-to-face contact with a distal end of the pole piece 218. Tabs 272, snap fasteners, a threaded interface, or other known means can be used to secure the cap 270 to the can cover 264. Optional configurations may combine the valve body 220, can cover 264, cap 270 and/or regulator body 274 into a single-piece construction.

An elongated, hollow regulator body 274 is fastened (e.g., via a self-retaining roll pin), threaded, adhered, or otherwise rigidly secured to the second (proximal) end 223 of the valve body 220. A fluid exhaust passage 280 extends through the regulator body 274, fluidly connecting the exhaust port 230 of the valve body 220 to a fluid outlet 282 at the opposing (terminal) end of the regulator body 274. The regulator body 274 is formed with a regulator valve seat 284 in the exhaust passage 280, and a regulator valve assembly adjacent the valve seat 284. The regulator valve assembly of FIG. 5 is generally composed of a movable check ball 288 seated against a helical spring 290, which operates to bias the check ball 288 against the regulator valve seat 284. A plug 292 is nested inside the exhaust passage 280, and supports thereon the spring 290 and check ball 288.

The inset view provided in FIG. 5 presents an enlarged illustration of the point of interface between the pole piece 218, the tubular distal portion 260 of the valve body 220, and the inner-diameter surface of the annular polymeric bobbin 265 to help demonstrate an air-leak detection feature of the valve assembly 210. By way of example, and not limitation, the pole piece 218 is immovably positioned within the hollow interior core 215 of the annular coil 214, adjacent the armature assembly 216, and fluidly sealed with the valve body 220 via O-ring 261. As will be described in further detail below, the pole piece 218 and valve body 220 have structural features that cooperatively define an intentional fluid leak path 267 that will allow a detectable amount of air to pass therethrough when there is an inadvertent leak of the aforementioned fluid seal (e.g., a break in or an absence of the O-ring seal).

Figure 6A:
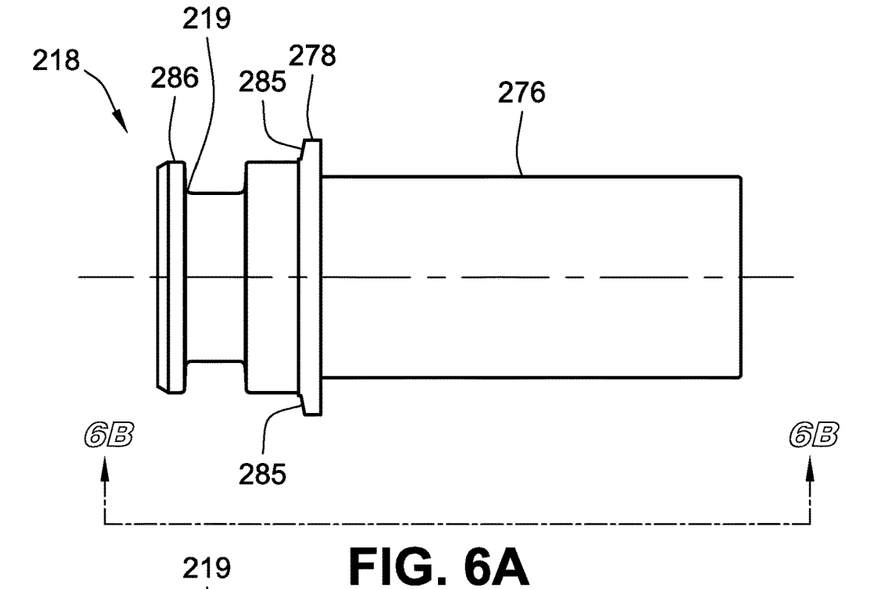
FIG. 6A is a side-view illustration of a representative pole piece of the solenoid valve assembly of FIG. 5 in accordance with aspects of the present disclosure.
Figure 6B:
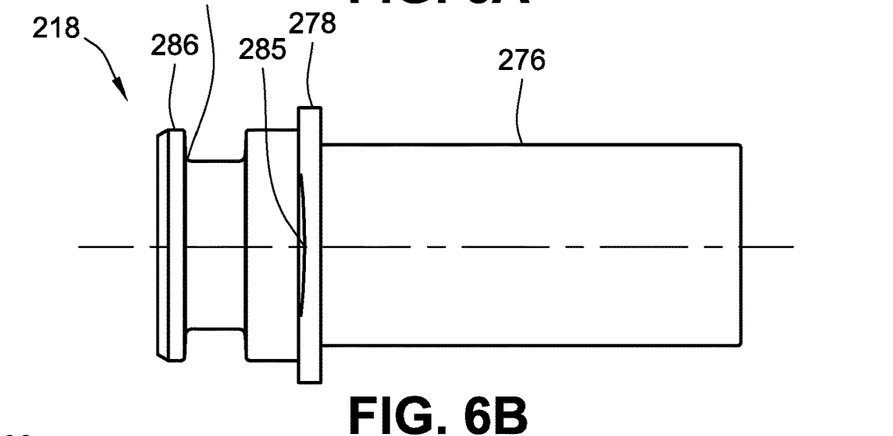
FIG. 6B is another side-view illustration of the representative pole piece of FIG. 5 shown from the perspective of arrow line 6B-6B in FIG. 6A.

With collective reference to both FIGS. 6A and 6B, the pole piece 218 includes an elongated, cylindrical body 276 with a toroidal flange 278 and an enlarged-diameter head segment 286 at one end of the pole piece body 276. For at least some embodiments, the pole piece 218 is integrally formed as a single-piece unitary structure from a material of high magnetic permeability (e.g., low-carbon steel) that directs the magnetic field produced by the coil assembly 262 to help improve the functionality of the assembly 210. Alternative applications may require the pole piece 218 comprise multiple distinct components that are joined to form a unitary structure. In accord with the illustrated example, the flange 278 projects generally orthogonally in a radially outward direction from the elongated body 276. Additionally, the toroidal flange 278 extends in an uninterrupted manner around the outer circumference of the body 276 to define a continuous or substantially continuous rim. It is also possible to form the flange 278 as a discontinuous structure, such as a segmented annulus or a ring with one or more through holes. In either case, the flange 278 is sufficiently large to seat against the tubular portion 260 such that the pole piece 218 is trapped between the cap 270 and the valve body 220, as seen in FIG. 5. By comparison, the head segment 286 is sized to span the inner diameter of the tubular portion 260. The head segment 286 is also fabricated with the recessed annular groove 219 into which is fit the flexible O-ring seal 261.

Machined, formed, or otherwise integrated into the pole piece flange 278 is one or more chamfered portions 285 that at least partially define the fluid leak path 267 between the pole piece 218 and valve body 220. The representative pole piece 218 illustrated in FIGS. 6A and 6B includes two discrete chamfered portions 285 that are spaced apart (e.g., approximately 120 degrees from edge-to-edge; 190 degrees from center-to-center) from each other around the perimeter of the toroidal flange 278. Alternative configurations may comprise greater or fewer chamfered portions spaced equidistantly or irregularly around the flange. While the flange 278 can include an assortment of differently shaped and sized chamfers, it may be desirable for ease of manufacturing that each chamfered portion 285 be scalloped into the flange 278 as a recessed, arcuate chamfer, known to many in the art as a "cove chamfer". As another option, each chamfered portion may extend partially (as shown) or completely through the thickness of the flange 278. The uppermost edge of the tubular distal portion 260 may be formed or machined with a chamfered segment 263 that is juxtaposed with the chamfered portion(s) 285 of the flange 278, as seen in the inset view of FIG. 5. This chamfered segment 263 may extend continuously or in a discontinuous manner along an inner perimeter of the edge of the tubular portion 260. With this arrangement, the chamfered portion(s) 285 and chamfered segment(s) 263 cooperatively define a portion of a fluid leak path 267.

Figure 7:
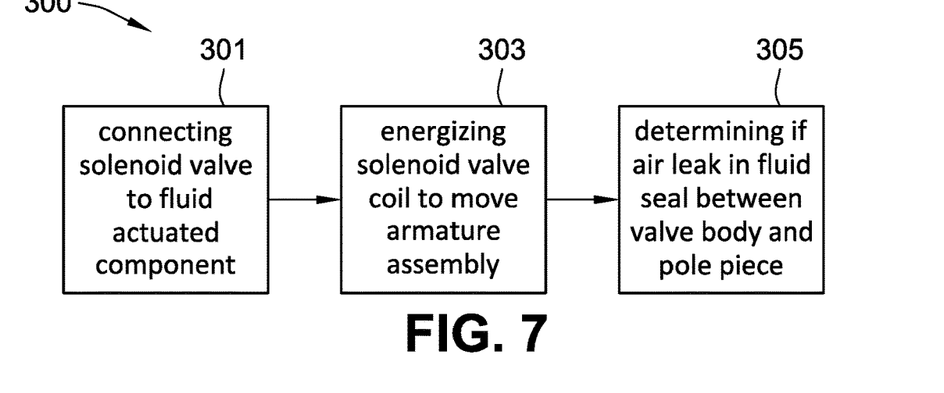
FIG. 7 is a flow chart or work flow diagram illustrating a representative method for testing a solenoid valve assembly in accordance with aspects of the present disclosure.

As seen in FIG. 7, a representative method 300 of testing the solenoid valve assembly 210 may comprise, as indicated at block 301, first fluidly connecting the valve body 220 of the solenoid valve assembly 210 to the fluid actuated component. One manner in which this step can be completed is portrayed in FIG. 1, e.g., where the solenoid valve assembly 210 can be mounted to an engine cylinder block 12 via a bolt 96, and the primary supply port 224, secondary supply port 226, control port 228, and exhaust port 230 are operatively aligned or otherwise fluidly connected to the supply passage 104, control passage 106 and sump passage 108. Once properly mounted, the solenoid assembly 210 is activated, e.g., by energizing or deenergizing the coil 214 at block 303 to responsively move the armature assembly 216 within the interior cavity of the valve body 220. At block 305, the coil assembly 262 can be concomitantly monitored, e.g., by an air pressure sensor, to identify any inadvertent leaks in the fluid seal between the valve body 220 and pole piece 218. For instance, if the O-ring 261 is missing or fractured, air will escape from the gap 248 between the pole piece 218 and the armature 244, and pass around the head segment 286 and up through the intentional fluid leak path 267 and out of the solenoid can cover 264.

While aspects of the present disclosure have been described in detail with reference to the illustrated embodiments, those skilled in the art will recognize that many modifications may be made thereto without departing from the scope of the present disclosure. The present disclosure is not limited to the precise construction and compositions disclosed herein; any and all modifications, changes, and variations apparent from the foregoing descriptions are within the scope of this disclosure. Moreover, the present teachings expressly include any and all combinations and subcombinations of the preceding elements and features.

What is claimed:

1. A solenoid valve assembly comprising:
   a valve body defining an interior cavity and a supply port and a control port each fluidly connected to the interior cavity;
   a selectively energizable coil defining an interior core;
   an armature assembly configured to move within the interior cavity between a first position and a second position responsive to the coil being energized, the armature assembly and the valve body being cooperatively configured to regulate fluid flow from the supply port to the control port when the armature assembly is in the first or second position; and
   a pole piece at least partially disposed within the interior core of the coil adjacent the armature assembly, the pole piece including a pole piece body with a flange projecting from the pole piece body, the flange abutting the valve body and including a chamfered portion; and
   a seal establishing a fluid seal between the valve body and the pole piece,
   wherein the valve body and the chamfered portion of the flange cooperatively define a fluid leak path configured to pass air therethrough responsive to an inadvertent leak in the fluid seal.

2. The solenoid valve assembly of claim 1, wherein the pole piece body is cylindrical and includes an enlarged-diameter head segment at one end of the pole piece, the enlarged-diameter head segment defining a recessed groove within which is seated the fluid seal, and wherein the flange is toroidal, spaced from the recessed groove, and projects radially outward from the pole piece body.

3. The solenoid valve assembly of claim 1, wherein the flange includes a first surface seated against the valve body and a second surface generally orthogonal with and adjoining the first surface.

4. The solenoid valve assembly of claim 1, wherein the chamfered portion includes an arcuate cove chamfer.

5. The solenoid valve assembly of claim 1, wherein the flange projects from the pole piece body to define a continuous rim, and the chamfered portion includes a plurality of discrete chamfered portions spaced apart from each other around a perimeter of the continuous rim.

6. The solenoid valve assembly of claim 1, wherein the valve body includes a tubular portion, the flange being seated against an edge of the tubular portion, the edge including a chamfered segment that cooperates with the chamfered portion of the flange to at least partially define the fluid leak path.

7. The solenoid valve assembly of claim 6, wherein the chamfered segment extends continuously along a perimeter of the edge of the tubular portion.

8. The solenoid valve assembly of claim 1, wherein the seal includes a flexible seal mounted to the pole piece, and wherein the inadvertent leak includes a break in, an improper seating of, a defect in, or an absence of the flexible seal.

9. The solenoid valve assembly of claim 8, wherein the pole piece includes an enlarged head segment at one end of the pole piece, and the flexible seal includes a polymeric O-ring extending continuously around the enlarged head segment.

10. The solenoid valve assembly of claim 1, further comprising:
    a regulator body attached to the valve body and defining an exhaust passage fluidly connected to an exhaust port defined through an end of the valve body; and
    a regulator valve positioned in the regulator body and configured to prevent fluid flow through of the exhaust passage when a fluid pressure on the regulator valve is not greater than a predetermined pilot pressure, and configured to permit fluid flow through the exhaust passage when the fluid pressure on the regulator valve is greater than the predetermined pilot pressure.

11. The solenoid valve assembly of claim 10, wherein the regulator body includes a regulator valve seat, and the regulator valve includes a check ball and a spring biasing the check ball towards the regulator valve seat.

12. The solenoid valve assembly of claim 11, further comprising a plug at least partially disposed within the exhaust passage and supporting thereon the spring, the plug having an orifice that permits fluid to pass through the plug.

13. The solenoid valve assembly of claim 1, wherein the supply port includes a primary supply port and a secondary supply port, and wherein the valve body and armature assembly are cooperatively configured to: (1) permit fluid flow from the secondary supply port to the control port at a predetermined pilot pressure and block fluid flow from the primary supply port to the control port when the armature is in the first position; and (2) permit fluid flow from the primary supply port to the control port when a supply pressure is greater than the predetermined pilot pressure and the armature is in the second position.

14. The solenoid valve assembly of claim 13, wherein the valve body includes a first valve seat between the primary supply port and the control port, and a second valve seat between the control port and an exhaust port, and wherein the secondary supply port is in fluid communication with the interior cavity and the control port between the first valve seat and the second valve seat.

15. A solenoid valve assembly for regulating fluid flow to a fluid actuated component, the solenoid valve assembly comprising:
a valve body defining an interior cavity and a supply port, a control port, and an exhaust port each extending through the valve body and fluidly connecting to the interior cavity, the control and supply ports being configured to fluidly connect to the fluid actuated component;
a selectively energizable annular coil attached to the valve body and defining an interior core;
an armature assembly disposed within the interior cavity of the valve body and configured to move within the interior core of the annular coil from a first position to a second position responsive to the coil being energized, the armature assembly and the valve body being cooperatively configured to regulate fluid flow from the supply port to the control port when the armature assembly is in the first position and/or the second position; and
a pole piece attached to the valve body and at least partially disposed within the interior core of the coil adjacent the armature assembly, the pole piece having a fluid seal with the valve body, the pole piece including a pole piece body with a flange projecting from the pole piece body, the flange abutting the valve body and including a chamfered portion,
wherein the chamfered portion of the pole piece and the valve body cooperatively define a fluid leak path configured to pass air therethrough responsive to an inadvertent leak of the fluid seal.

16. The solenoid valve assembly of claim 15, wherein the flange includes a first surface seated against the valve body and a second surface generally orthogonal with and adjoining the first surface.

17. The solenoid valve assembly of claim 16, wherein the valve body includes a tubular portion, the flange being seated against an edge of the tubular portion, the edge including a chamfered segment that cooperates with the chamfered portion of the flange to at least partially define the fluid leak path.

18. The solenoid valve assembly of claim 17, further comprising a flexible seal mounted to the pole piece to define the fluid seal, and wherein the inadvertent leak includes a break in, an improper seating of, a defect in, or an absence of the flexible seal.

19. A method of testing a solenoid valve assembly, the solenoid valve assembly including a valve body defining a supply port and a control port each fluidly connected to an interior cavity, the solenoid valve assembly including a selectively energizable coil attached to the valve body and defining an interior core, the method comprising:
energizing or deenergizing the coil to responsively move an armature assembly within the interior cavity of the valve body from a first position to a second position, the armature assembly and the valve body being cooperatively configured to regulate fluid flow from the supply port to the control port when the armature assembly is in at least one of the first or second positions; and
identifying an inadvertent leak of a fluid seal between the valve body and a pole piece at least partially disposed within the interior core of the coil adjacent the armature assembly, the pole piece including a pole piece body with a flange projecting from the pole piece body, the flange abutting the valve body and including a chamfered portion,
wherein the chamfered portion of the pole piece and the valve body cooperatively define a fluid leak path that passes air therethrough responsive to the inadvertent leak of the fluid seal.

20. The method of claim 19, wherein the flange includes a first surface seated against the valve body and a second surface generally orthogonal with and adjoining the first surface.

21. The method of claim 20, wherein the flange projects from the pole piece body to define a continuous rim, and the chamfered portion includes a plurality of discrete chamfered portions spaced apart from each other around a perimeter of the continuous rim.

22. The method of claim 20, wherein the valve body includes a tubular portion, the flange being seated against an edge of the tubular portion, the edge including a chamfered segment that cooperates with the chamfered portion of the flange to at least partially define the fluid leak path.

23. The method of claim 19, wherein the fluid seal includes a flexible seal attached to the pole piece, the inadvertent leak including a break in or an absence of the flexible seal.

* * * * *